Figure 1:
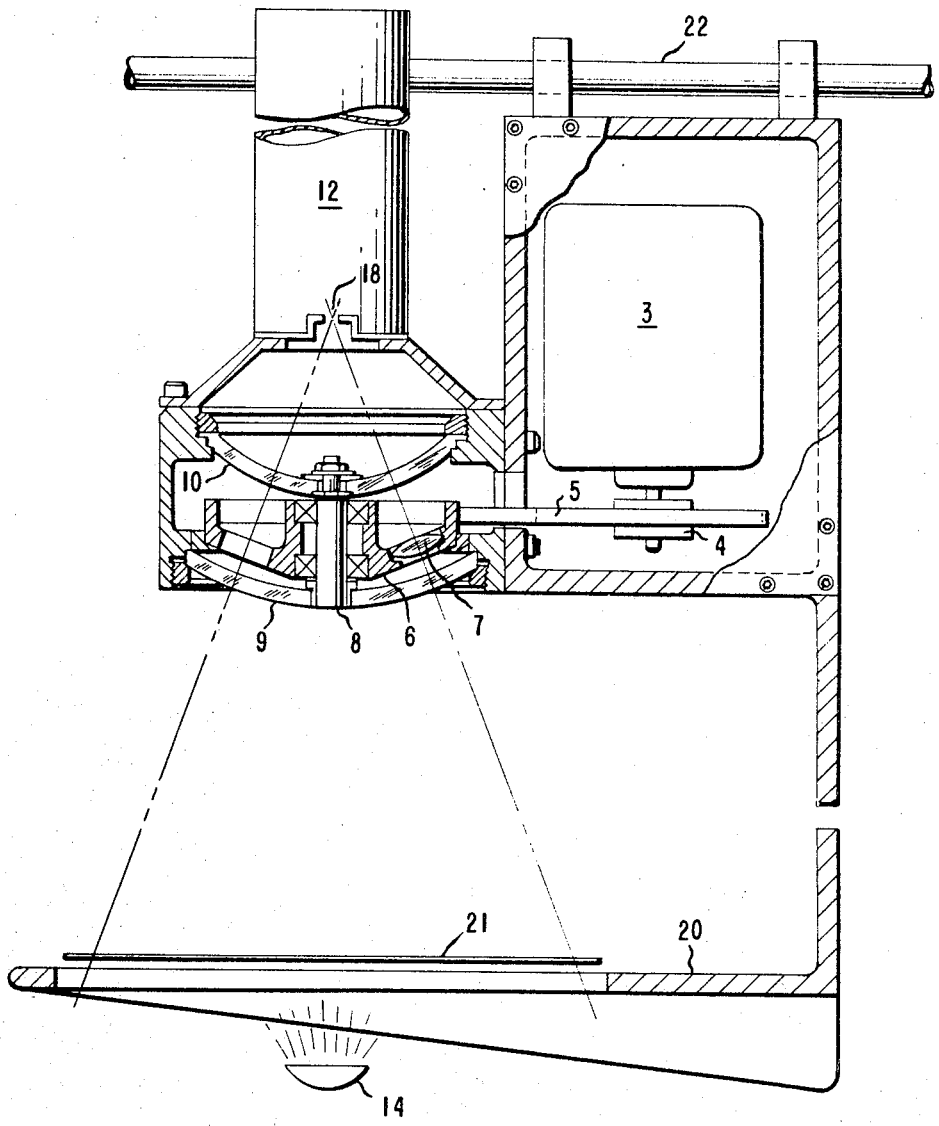
Figure 2:
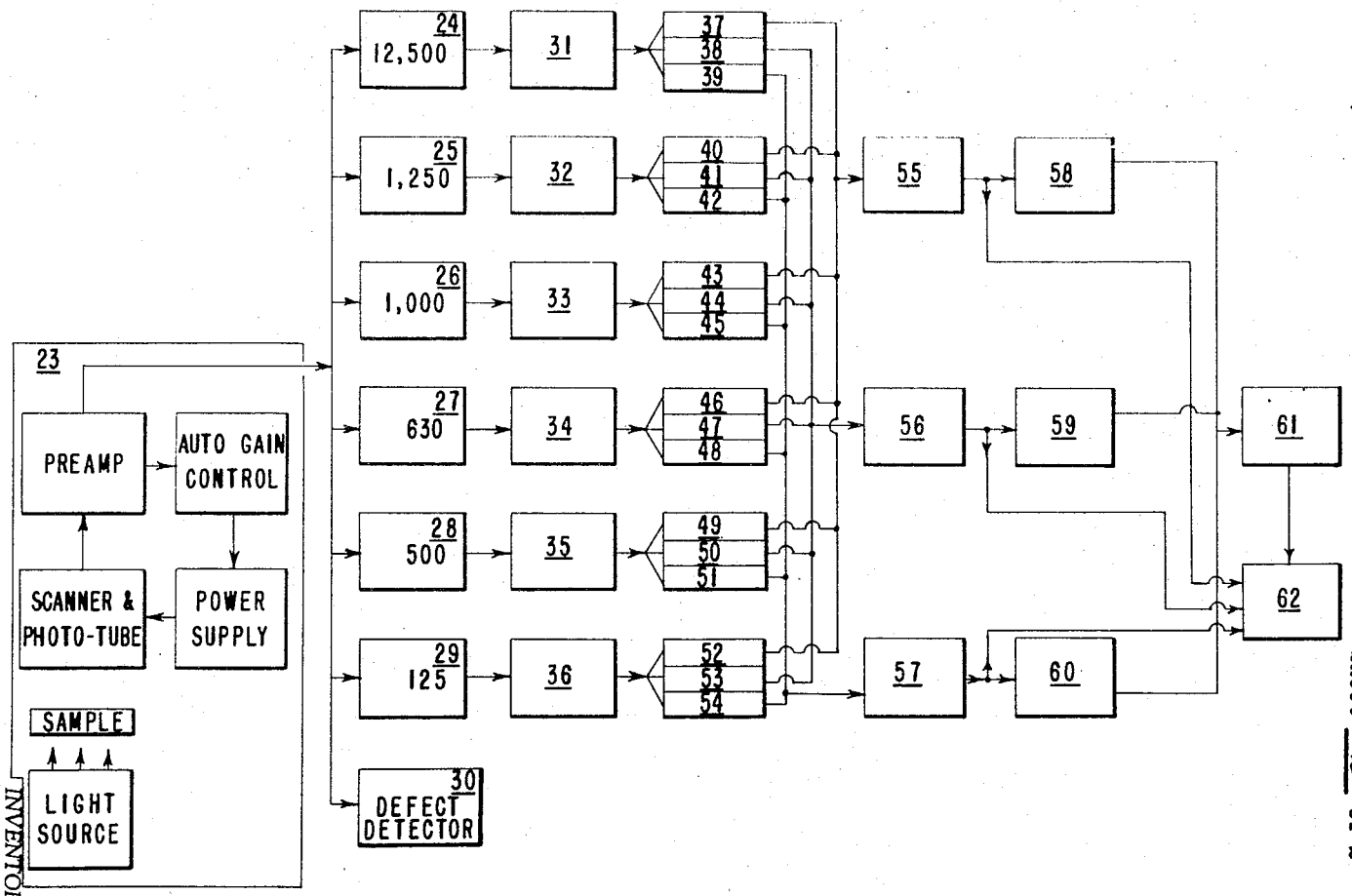

T861059

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1357

774,071

APPARATUS FOR ANALYZING UNIFORMITY OF SHEET-LIKE MATERIAL

Gerhardt E. Meyer, Wilmington, Del., and Charles B. Moore, Condordville, Pa., assignors to E. I. du Pont de Nemours and Company, Wilmington, Del., a corporation of Delaware

Filed Nov. 7, 1968. Published Apr. 29, 1969
Int. Cl. G01n *21/30;* H01j *39/12*
U.S. Cl. 250—219
2 Sheets Drawing. 15 Pages Specification

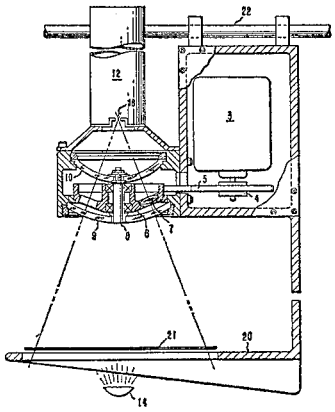

A system for analyzing the uniformity of a product comprising in combination a first scanning means for sensing a sample continuously using a circular motion and converting an optical signal received from said sample into a continuous electrical signal, and a second analyzing means for receiving said electrical signal continuously, which in turn separates said electrical signal into a plurality of components each having a particular frequency and amplitude. The first means for rotary scanning of the sample may be used to scan either transmitted light or reflected light from the sample. Normally, the scanner will be arranged to rotate continuously while the sample or portion of sample to be scanned may be held stationary or may move in a plane parallel to the plane of rotation of the scanner. The second analyzing means is normally a frequency analyzer which filters the continuous electrical signal into a plurality of preselected frequency bands each representing a particular type of defect and measures quantitatively the amplitude of the signal portion of each band. The number of preselected frequency bands may vary depending upon the number and kind of different defects which are characteristic of the sample being analyzed.

April 29, 1969 G. E. MEYER ET AL DEF. PUB. T861059

APPARATUS FOR ANALYZING UNIFORMITY OF SHEET-LIKE MATERIAL SN-774071

Filed Nov. 7, 1968 Sheet 1 of 2

INVENTORS
GERHARDT E. MEYER
CHARLES B. MOORE

BY E. Leigh Hunt

ATTORNEY

T861059

SN - 774071

April 29, 1969 G. E. MEYER ET AL DEF. PUB.

APPARATUS FOR ANALYZING UNIFORMITY OF SHEET-LIKE MATERIAL

Filed Nov. 7, 1968 Sheet 2 of 2

INVENTORS
GERHARDT E. MEYER
CHARLES B. MOORE

BY E. Leigh Hunt

ATTORNEY